United States Patent

[11] 3,530,944

| [72] | Inventor | Perry W. Spell<br>Roseboro, North Carolina 28382 |
|---|---|---|
| [21] | Appl. No. | 862,347 |
| [22] | Filed | Sept. 30, 1969<br>Continuation-in-part of Ser. No. 623,911,<br>filed Mar. 17, 1967, abandoned |
| [45] | Patented | Sept. 29, 1970 |

[54] AGRICULTRAL IMPLEMENT
6 Claims, 9 Drawing Figs.

[52] U.S. Cl. .................................................. 172/59,
172/76;78;99;103;111;125;421;657;710
[51] Int. Cl. ......................................................... A01b 33/06
[50] Field of Search ........................................... 172/5, 38,
58, 56, 59, 111, 108, 117, 99, 133, 52, 648, 264,
265, 387, 397, 624, 626, 99, 629, 657, 613, 54,
233—235; 56/(Inquired)

[56] References Cited
UNITED STATES PATENTS

| 518,363 | 4/1894 | Brookens | 172/99X |
| 1,307,672 | 6/1919 | Johnson | 172/5 |
| 2,366,386 | 11/1945 | Clark | 172/117X |
| 2,552,710 | 5/1951 | Dodson | 172/117X |
| 2,805,612 | 9/1957 | Beard | 172/111X |
| 3,059,704 | 10/1962 | Kasatkin | 172/99X |
| 3,115,739 | 12/1963 | Thoen et al. | 172/59X |

FOREIGN PATENTS

| 517,542 | 2/1953 | Belgium | 172/234 |
| 862,274 | 11/1940 | France | 172/657 |
| 1,006,019 | 1/1952 | France | 172/56 |
| 1,140,658 | 3/1957 | France | 172/58 |
| 1,236,648 | 6/1960 | France | 172/233 |

*Primary Examiner*—Robert E. Pulfrey
*Assistant Examiner*—Alan E. Kopecki
*Attorney*—John G. Mills III

ABSTRACT: In abstract, a preferred embodiment of this invention is an earth scarifying device capable of operating between small, tender plants attached to the rear of a tractor and operated by the power take-off of such tractor.

Patented Sept. 29, 1970

INVENTOR.
PERRY W. SPELL
BY John G. Mills
ATTORNEY

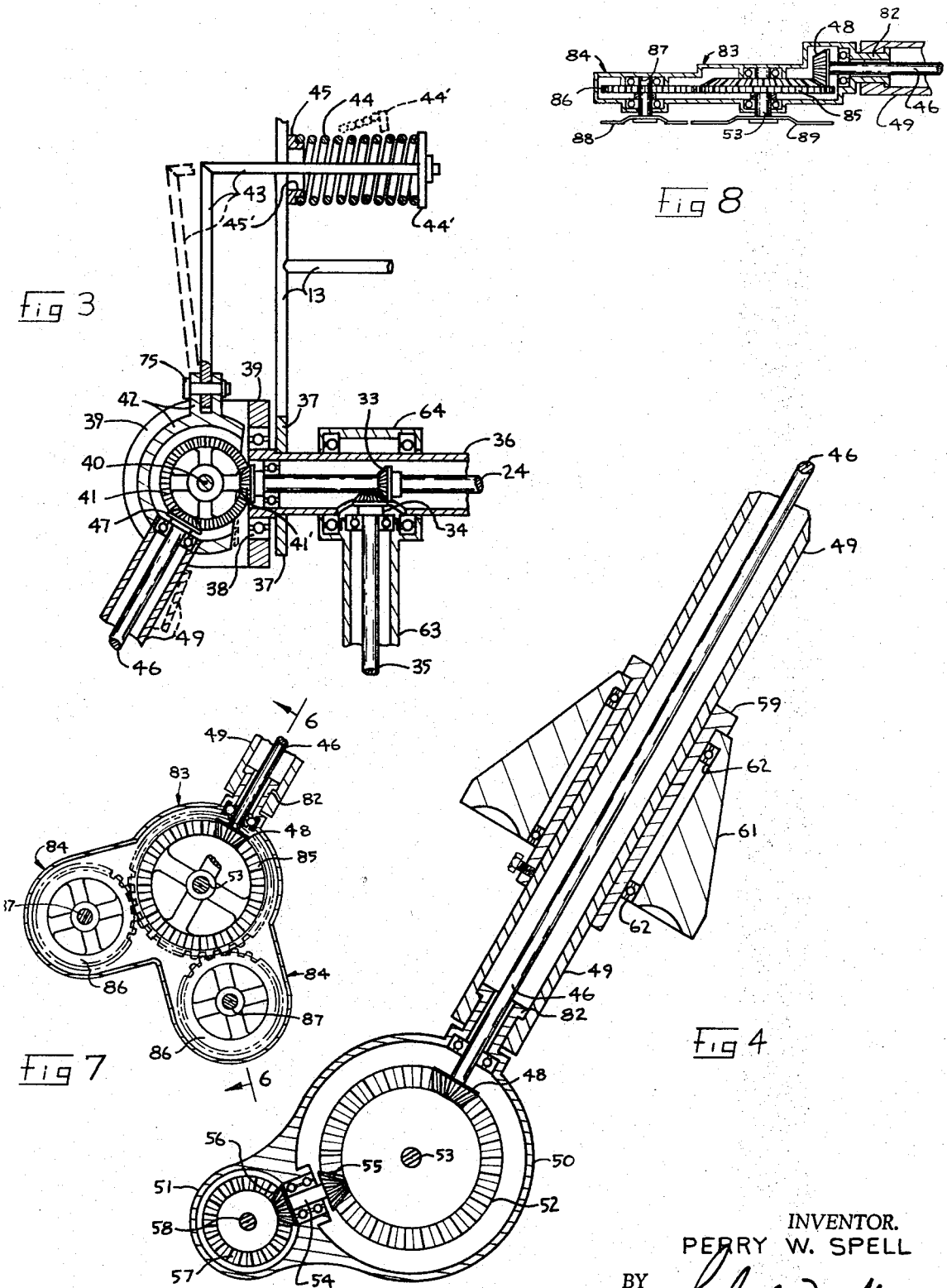

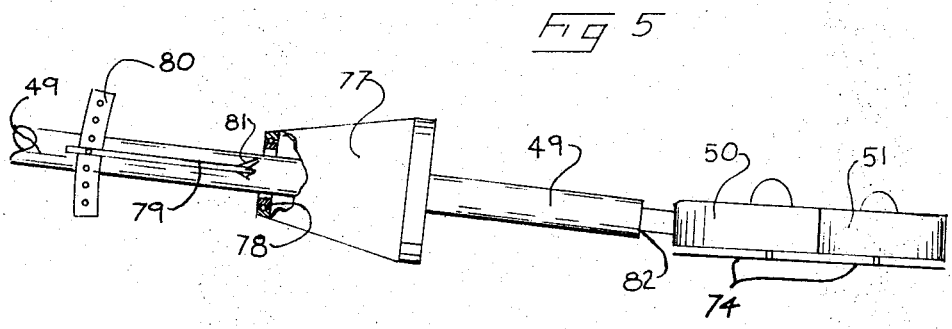
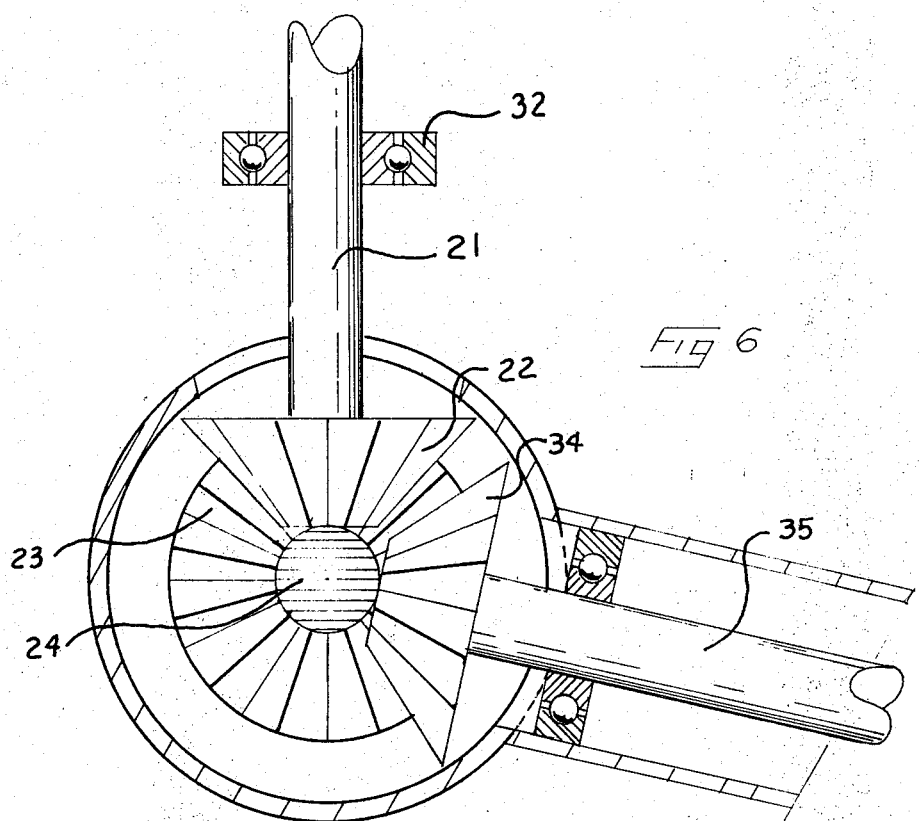

AGRICULTRAL IMPLEMENT

This is a continuation-in-part of application Ser. No. 623,911, filed March 17, 1967, now abandoned.

This invention relates to agricultural implements and more particularly to devices adapted to scarify the earth between rows of plants, across open fields, lots and the like.

In the past, various types of mowing devices have been used to remove grass and weeds from between the rows of crops such as cotton, soybeans and the like. None of these devices, however, have been able to get between the individual plants in the rows; therefore, it has been necessary to hire labor to use hand implements for this purpose. This process is extremely expensive and of questionable effect at best.

The present invention has been developed after much research and study into the above mentioned problems and is designed to allow a single laborer, driving a tractor, to remove all grass, weeds and other undesirable plants from between not only the rows but also from between each individual plant thereby completely eliminating all additional labor usually required for such an operation.

It is, therefore, an object of the present invention to provide a tractor mounted weed cutting and earth scarifying implement capable of removing undesirable plant growth from between both the individual plants of a row crop and from the area between such rows.

Another object of the present invention is to provide a mowing device having a multiplicity of cutting heads some of which are laterally moveable and all of which overlap in longitudinal travel in such a manner that a smooth overlapping swath is cut.

A further object of the present invention is to provide a mowing and earth scarifying device having a multiplicity of cutting heads, each of whose swath overlaps, so mounted that the two outside heads may swing laterally, thereby allowing the device to operate on three sides of a growing plant or other upright obstructions.

Another object of the present invention is to provide a device which is capable of being adjusted to both mow growing plants and to scarify the earth between the rows of a row crop as well as in open areas.

Another object of the present invention is to provide a plant cutting device having at least one laterally fixed cutter head and one laterally swingable cutter head so that a swath of varying width may be cut.

An additional object of the present invention is to provide at least one mowing type device having a main cutter head with an auxiliary cutter head mounted on one side thereof.

Another object of the present invention is to provide a cutting device including a main cutter head so mounted that it can move laterally during longitudinal travel and at least one auxiliary cutter mounted on the side of the main cutter in such a manner that the auxiliary cutter cuts a swath laterally a greater distance from the longitudinal center line of travel of the device than the main cutting device.

Another object of the present invention is to provide a cutting device having a multiplicity of cutting heads at least one of which is spring biased in a lateral direction away from the longitudinal center line of travel of the device.

Another object of the present invention is to provide a cutting device having a multiplicity of heads which are vertically adjustable for either mowing plant growth or scarifying the earth and are laterally adjustable for automatically cutting a swath of varying width depending on obstructions encountered.

Other objects and advantages of the present invention will become apparent and obvious from a study of the following description and the accompanying drawings which are merely illustrative of the present invention.

In the drawings:

FIG. 3 is a cut-away view of the connection and drive mechanism for a weaving arm;

FIG. 4 is a detailed cut-away view of the cutter drives of such arm;

FIG. 5 is a cut-away view of the lower drive mechanism;

FIG. 6 is a modification of the weaving arm height adjusting means and mounting for the cutter head;

FIG. 7 is a plan sectional view showing a modification of the weaving arm cutter and its drive;

FIG. 8 is a section taken through lines 8-8 of FIG. 7; and

Figures 1, 2, 9:
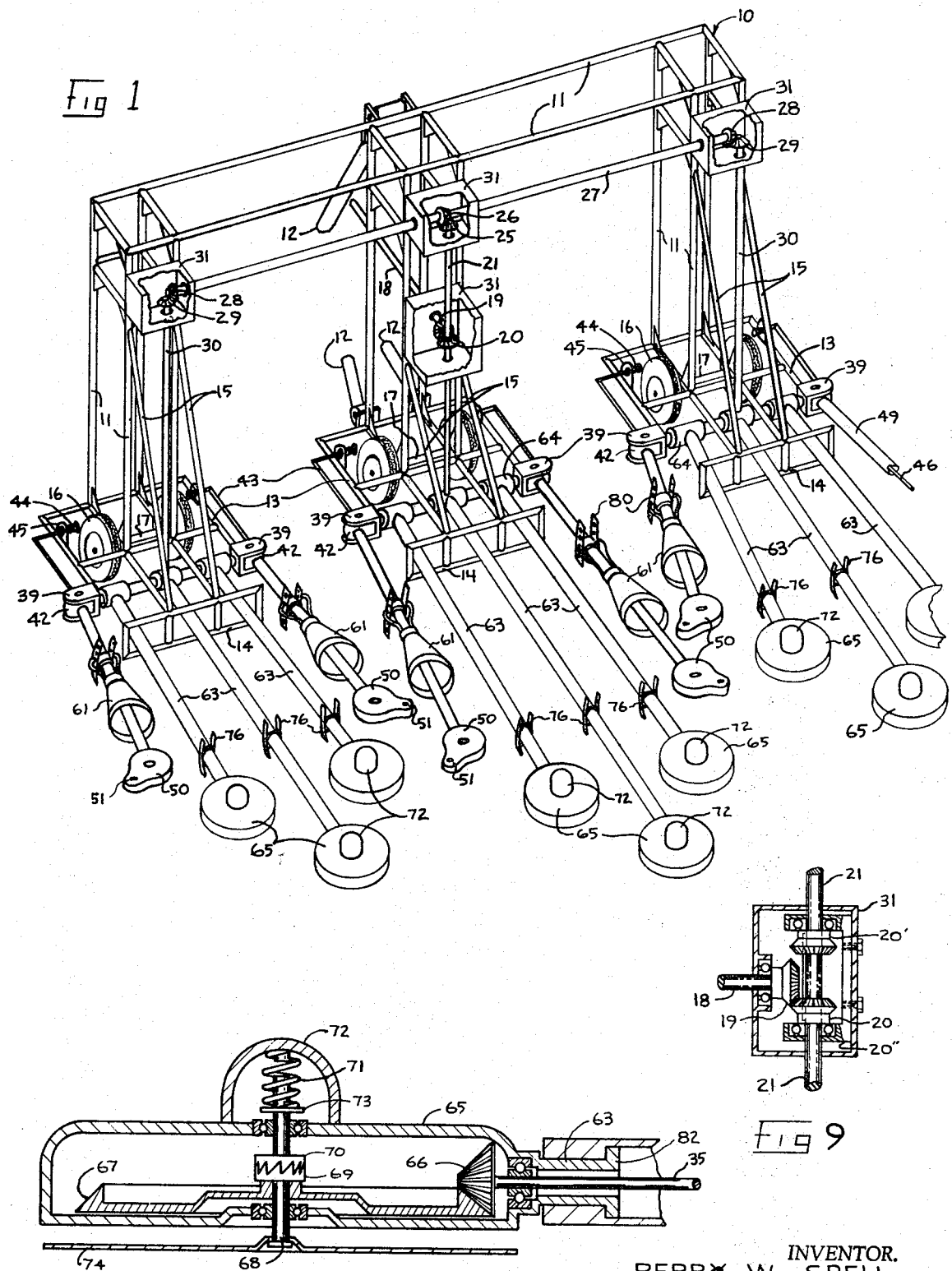
FIG. 1 is a perspective of a preferred embodiment of the present invention.
FIG. 2 is a sectional taken through lines 2-2 of FIG. 1.
FIG. 9 is a section through the dust box showing a gear arrangement to reverse the rotation of the blades.

With further reference to the drawings, FIG. 1 discloses an agricultural implement indicated generally at 10 composed of a generally E-shaped box frame 11 having support means 12 operatively secured thereto in the center portion thereof. These support means are adapted to operatively attach the frame 11 to the rear of a tractor or other power source means. Since the three-point hitch has become almost standard equipment for various types of tractors, three members are disclosed as forming the support means although other types of hitch supports could obviously be used.

Fixedly secured to the lower end of each of the downwardly projecting portions of E-frame 11 are horizontally disposed flat frame portions 13. Fixedly secured to the rear of each of these frame portions are vertically disposed, laterally aligned, guide frame portions 14. Angling downwardly from the upper portion of E-frame 11 to the top of each of the guide frames 14 are a series of fixedly secured brace members 15. The angle at which these brace members are set forms a rigid basis which will allow the cutter heads to be raised and lowered through use of the hydraulic systems of the carrying tractor as will be hereinafter described in more detail.

A set of control wheels 16 are rotatively mounted on axles 17 which are fixedly secured to each of the flat frame portions 13. Since it is desirable to have the agricultural implement of the present invention to travel over the earth at a uniform predetermined height, the size of wheels 16 becomes critical. Once the best height of operation is ascertained, wheels having a radius equal to such height may be mounted on axles 17. Separate height adjusting means are provided for each of the cutter heads as hereinafter described.

An input shaft 18 is provided for transmitting power from a rotative power source, such as the power takeoff of the propelling tractor, to the implement 10. Fixedly secured to the end of this input shaft is bevel gear 19. In operative engagement with gear 19 is bevel gear 20 which is fixedly secured to central vertical shaft 21.

On the lower end of central vertical shaft 21 is fixedly attached a bevel gear. This gear is in turn operatively meshed with bevel gear which is fixedly secured to lower horizontal drive shaft 24.

The upper end of central vertical shaft 21 has bevel gear 25 fixedly secured thereto. This gear 25 is in operative meshed engagement with bevel gear 26 which is fixedly secured to upper horizontal drive shaft 27. On each end of said drive shaft is fixedly secured bevel gears 28. Each of these gears are in turn meshed with bevel gears 29 which are fixedly secured to the upper end of outboard vertical drive shafts 30. The power input from the central and two outboard vertical drive shafts into the lower horizontal drive shafts is identical in each of the three gang units mounted on each of the flat frame portions 13 of the implement of the present invention.

A series of dust boxes 31 are provided over the junction of each of the above described meshed gears. Within the walls of these boxes are bearings (not shown) which mount the shafts in operative rotative position with the exception of the lower ends of each of the vertical shafts which have bearing brackets 32 to hold them in operative rotative position.

Although the relationship of the various parts of the lower horizontal drive shaft will be described in connection with the central vertical shaft, it is understood that the description is equally applicable to either of the outboard vertical shafts and their related mechanisms. As the lower horizontal shaft 24 rotates due to the input of power from the central vertical shaft 21, a series of bevel gears 33 fixedly secured thereto also rotate. Each of these bevel gears are in turn operatively meshed with bevel gears 34 which are fixedly secured to the inboard end of each of the cutter drive shafts 35.

A lower horizontal drive shaft housing 36 is rotatively mounted in brackets 37 of flat frame portions 13. Bearings such as those disclosed at 38 may be provided between brackets 37 and said housing. Fixedly secured to each end of housing 36 outboard of brackets 37 are swivel housings 39. Each of these housings are formed of two generally flat parallel portions disposed in spaced relation to each other. Between each of these portions is fixedly secured mounting shaft 40 upon which is rotatively mounted gear 41. Fixedly secured to each outer end of drive shaft 24 is bevel gear 41' which is adapted to operatively engage gear 41.

An inner housing 42 is adapted to be rotatively mounted on shaft 40 above and below gear 41 between the outwardly projecting portions of swivel housing 39 thereby allowing floating cutter 50 to swing laterally from side to side as will be hereinafter described.

Pivotally attached to the forward portion of inner housing 42 by pivot pin 75 is forwardly projecting L-shaped biasing arm 43. A spring means 44 is provided about the end of arm 43 opposite its attachment to housing 42. This spring bears between plate 45, which is fixedly secured to the forward portion of flat frame portion 13, and presser plate 44' of arm 43. As is obvious from FIG. 3, due to the enlarged opening 45' in plate 45, biasing arm 43 can respectively move therethrough as dictated by varying earth contours and obstructions encountered by head 51 of weaving arm 49.

A floating head drive shaft 46 is provided having a bevel gear 47 fixedly mounted on one end and bevel gear 48 fixedly secured to the other. Mounted about shaft 46 and integral with housing 42 is tubular housing 49. Fixedly secured to the outermost end of said housing 49 is a generally circular cutter head housing 50 with a bulbous outwardly projection cutter housing 51 integral therewith. Gear 52 is rotatively mounted within housing 50 on longitudinally slideable shaft 53. Said gear 52 is constantly meshed with bevel gear 48 and the relationship of such gearing to slideable shaft 53 is similar to that disclosed in FIG. 2 as will be hereinafter described in more detail.

A short rotatable shaft 54 is mounted between cutter housing 50 and the bulbous housing 51. Bevel gear 55 on one end of shaft 54 constantly meshes gear 52 while a second bevel gear 56 is mounted on the other end of such shaft and is in constant mesh with the gear 57. Gear 57 is rotatively mounted on slideable shaft 58 in a manner similar to that disclosed in FIG. 2.

The modification of the floating head disclosed in FIGS. 7 and 8 shows a mother head or housing indicated generally at 83 with appended auxiliary heads 84 operatively attached thereto. In this modification, the drive shaft 46 within tubular housing 49 is used. Bevel gear 48 can also be used which will drive the ring gear 85 which corresponds to ring gear 52, the difference in these two ring gears residing in the fact that gear 85 has outwardly projecting teeth about its periphery to form a spur gear. Two or more spur gears 86 are mounted for meshing engagement with gear 85. Each of these smaller spur gears are fixedly secured to rotatable shaft 87. This shaft passes out of the lower portion of housing 84 and has a blade or other cutting means 88 fixedly attached thereto. Thus it can be seen that as the shaft 46 rotates, ring gear 85 will be driven by bevel gear 48 which in turn, because of the spur teeth about its periphery, will drive spur gears 86 which rotates the blade or cutting means 88.

As is particularly clear in FIG. 6, the modified mother head or housing with its two or more auxiliary housings is a low profile cutting or scarifying head which can easily get under low lying plants without damaging the vegetation growing close to the earth. It can also get between small very narrowly spaced plants where prior known devices have been unable to operate.

Since a multiplicity of auxiliary cutters could be so spaced around the mother housing that overlapping swaths would be accomplished, the cutter or blade 89 operatively mounted below such mother housing could be eliminated.

Slideably mounted on tubular housing 49 is mounting sleeve 59. A set screw such as that disclosed at 60 may be provided to adjustably secure said sleeve to said housing. Rotatively mounted on sleeve 59 is conical support member 61. A pair of bearing members 62 may be provided between such support member and the mounting sleeve to insure smooth rotative relation therebetween.

Mounted about the cutter head drive shaft 35 is drive shaft housing 63. Integral with the inboard end of such housing is cylindrical housing 64 which has lower horizontal drive housing 36 rotatively passing longitudinally therethrough. As can readily be seen from FIG. 3, housing 64 encompasses and protects bevel gears 33 and 34 from damage due to dirt and other foreign matter.

At the end of drive shaft housing 63 opposite cylindrical housing 64 is fixedly secured cutter housing 65. Bevel gear 66 is fixedly secured to the outermost end of shaft 35. Particularly as disclosed in FIG. 2, bevel gear 66 is in operative mesh with gear 67 which is rotatively mounted on longitudinally slideable shaft 68. Fixedly secured to gear 67 and rotatively mounted on shaft 68 is lower clutch member 69. In releasable operative engagement with said lower clutch member is upper clutch member 70 which is fixedly secured to slideable shaft 68. Downwardly biasing means such as spring 71 presses between the upper portion of shaft housing 72 and fixedly secured press ring 73 of shaft 68 to maintain clutch members 69 and 70 in releasably operative engagement.

A cutter means such as blade 74 is replaceably secured to the lower end of longitudinally slideable shaft 68.

A release mechanism similar to the releasable clutch hereinabove described is also incorporated within housing 50 wherein shaft 53 of FIG. 4 would be equivalent to shaft 68 of FIG. 2 while gear 52 would be equivalent to gear 67 of FIG. 2. Likewise, shaft 58 mounted within housing 51 incorporates in its upper portion a release mechanism similar to that disclosed within the housings of FIG. 2.

It is noted that in normal earthworking operation the swath cut by head or housing 50 overlaps that cut by its adjacent head 65, and that the swaths cut by adjacent heads 65 overlap each other.

In actual operation of the agricultural implement of the present invention, the overall frame 10 is connected to a tractor (not shown) by means of supports 12. The hydraulic system of the tractor may then be used to lift the entire implement clear of the ground with the cutter heads 65 being supported through drive shaft housings 63 by guide frame portions 14. Likewise, cutter heads 50 will be raised through the leverage action between biasing arm 43 and a stop (not shown) which limits the pivoting movement between such arm and housing 42. If desired, the lower supporting portion of guide frame 14 could be extended outwardly to come into lifting engagement with shaft housings 49 when the overall implement 10 is in raised position.

Once the implement is aligned in operative position, either in an open field or with flat frame portions 13 between the rows of a row crop, the overall device may be lowered so that control wheels 16 are in operative engagement with the ground. Depending on the predetermined setting, cutter blades 74 mounted within housings 50, 51 and 65 may be in any position from above the earth to a predetermined position slightly below the earth. In this latter position, of course a scarifying effect will be achieved thereby removing weeds and other undesirable growth without damaging or injuring the young roots of the crop being cultivated.

To accurately adjust the relation of the blades 74 below housings 65 to the earth, support members such as skids 76 may be mounted on shaft housings 63 in longitudinally adjustable manner. Thus it can be seen that the closer skids 76 are placed to housings 65, the higher housing 65 will be raised;

wherein the further from housing 65 that skids 76 are placed the lower the housings and thus the blades thereunder will be.

To adjust the height of the blades beneath housings 50 and 51 in relation to the earth, conical support members 61 are mounted on shaft housings 49 in longitudinally adjustable manner. This also allows the inward and outward movement of housing 59 since members 61 are rotatively mounted on mounting sleeves 59. Thus it can be readily be seen that member 61 acts relative to the vertical adjustments of the cutter housings in the same manner as skid members 76 as well as acting as a wheel for lateral movement of the floating cutting head.

A modification of the above described height adjusting means for the swing arm would be to provide a hollow conical support 77 which is rotatively mounted on cone support member 78. This support member encircles housing 49 and is larger than the cross section diameter thereof. This looseness of fit allows cone 77 to tip as set forth below. Fixedly secured to the support member 78 is a support arm 79 which is adapted to selectively engage one of the notches 80' of bracket 80 which is in turn fixedly secured to housing 49. A pair of brace members 81 may be fixedly secured between cone support member 78 and support arm 79 to more rigidly support the fixed predetermined relation between these two members. Thus it can be seen that the height of the cutter head 50 on the end of housing 49 may be adjusted by moving support arm 79 to a lower or high position on bracket 80 thus tipping the cone either up or down. Since the hollow conical support 77 is rotatively mounted on cone support member 78, the lateral movement of head 50 will cause the cone 77 to roll as has previously been described with conical support member 61.

To allow the cutter head 50, with its auxiliary cutter head 51, to accurately follow the contour of the earth, a sleeve 82 is fixedly secured to such head as to allow the end of housing 49 to rotatively support said cutting units. Suitable bearings and longitudinal retaining means (not shown) may be provided to assure free rotative movement between sleeve 82 and housing 49. It may thus be seen that as the floating cutting heads 50 and 51 pass down a row crop such heads will automatically adjust themselves to the contour of the row whether it is flat or substantially hilled.

Once the implement is in operative position, rotative power is applied to input shaft 18 from a rotative power source such as the power takeoff of the tractor (not shown). The rotation of shaft 18 through bevel gears 19 and 20 rotates shaft 21. Through bevel gears 25 and 26, this rotative power is imparted to upper horizontal drive shaft 27 which in turn through gears 28 and 29 rotate downwardly projecting outboard vertical drive shafts 30. These two outer drive shafts and central shaft 21, through the meshing of gears 22 and 23, rotate the three lower horizontal drive shafts 24 mounted within housings 36 on flat frame portions 13. Through the series of gears 33 and 34, the various shafts 35 within the various housings 63 are rotated. Gears 67 are thereby rotated through bevel gears 66, and when clutch members 69 and 70 are in operative engagement, will rotate blades 74 below the various housings 65.

Should any of the blades 74 come into engagement with an obstruction such as a large rock, extremely hard earth, etc., spring 71 will compress due to the disengaging pressure between the teeth of clutch members 69 and 70 thereby longitudinally sliding shaft 68 upwardly to allow gear 67 (or 52 or 57 as the case may be) to continue to rotate. Once the obstruction has been passed over the forward travel of the implement, spring 71 will force re-engagement of clutch members 69 and 70 thereby again causing blade 74 to rotate. It is obvious that this safety mechanism will prevent damage to the various gearings and shafts of the present invention as well as protecting the blades 74.

To allow flexible vertical movement between cutter housings 65 and the remainder of the implement, rotatively mounted cylindrical housings 64 form laterally fixed vertical disposed planes of travel for each of the shaft housings 63 and their associated cutter housings. It will be obvious, particularly from FIG. 3, that this vertical travel of the cutter housings will not in any way affect the meshing of gears 33 and 34 thereby insuring constant rotative motion to all of the blades 74 mounted below the various housings of 65.

The power input for each of the blades 74 mounted beneath the housings 50 and 51 is supplied through bevel gears 41', gears 41 and bevel gears 47 of the multiplaner connections formed by housings 39 and 42. Since housings 36 are free to rotate; and further since housings 39 are fixedly secured to the ends of housings 36, it may be readily seen, particularly in FIG. 3, that shaft housings 49, with cutter housings 50 and 51 on the ends thereof, may be moved up and down in vertical planes without affecting the meshing of the above mentioned gears. Also since the angles of engagement between gears 41 and bevel gears 47 are approximately 90°, lateral movement in horizontal planes of housings 49 will not effect the constant meshing.

Since gears 52 and 57 are inter-connected by way of bevel gears 55 and 56 and shaft 54, the rotative power input on shaft 46 will rotate shafts 53 and 58 and the blades connected thereto.

Since the blades of any cutting or scarifying device will dull during use, the modified gearing disclosed in FIG. 7 changes the drive from input shaft 18 and its attached bevel gear 19 to either bevel gear 20 or bevel gear 20' depending on which of these last two mentioned gears is in operative mesh. By shifting these two inter-connected bevel gears along with the keyed supporting bracket 20" thereof, the direction of rotation of shaft 21 can be reversed with unidirectional rotation of shaft 18. Thus it can be seen that as vertical shaft 21 reverses so do all of the connected blades within all of the housings of the device of the present invention. As the blades are rotated in one direction, the edge opposite the cutting edge will, by natural action, sharpen itself so that when the cutting edge again becomes dull, the direction of rotation may once again be reversed to expose a sharpened blade.

As the implement of the present invention moves over the earth, each set of housings 50 and 51 are outwardly biased away from their respective groups of shaft housings 63. This biasing action is accomplished through springs 44 which place pressure against spring pressure plates 44' of arms 43 thereby biasing such arms in the direction of the arrow shown in FIG. 3. This causes shaft housings 49 to be biased outwardly due to the pivoting action of vertically mounted shafts 40. When an obstruction is encountered by one of the bulbous housings 51, housing shafts 49 will be moved inwardly toward shaft housings 63 thereby allowing said housings 51 to pass by the obstruction. As soon as such obstruction is passed, the biasing effect of spring 44 will again move the shaft housing 49 and its attached members outwardly to their limit of lateral travel.

Although not particularly pointed out in the above description, it is obvious from the drawings that each of the various drive shafts of the present invention is rotatively mounted on bearing means.

Thus it can be seen that as the present invention is operated, rotative power is transmitted from the power takeoff of the operating tractor, through overload disengaging clutches and into blades rotatively mounted below each of the various cutter blade housings thereby allowing an extremely wide swath to be cut due to the overlapping fashion of mounting of the various cutter heads. This swath may be narrowed when necessary by the engagement of the floating heads, indicated generally as housings 50 and 51, with obstructions such as the growing plants of a row crop. It therefore can be seen that the earth may be scarified not only in the area between two growing row crops, but actually be scarified between the individual plants due to the fact that the cutter mechanism mounted within the bulbous housings 51 is floating which allows it to project in and out between the individual plants.

It is obvious that the present invention has the advantage of being faster and more efficient in mowing operations as well as in scarifying operations since it has means for adjusting the height of each individual cutting head as well as means for operating between each individual plant of a row crop thereby allowing complete cutting or removal, as the case may be, of undesirable growth not only between the rows but between the individual plants of each individual row.

Although the terms, "upper", "lower", "bottom", "top" and so forth have been used herein, they are merely for convenience in the foregoing specification to describe the agricultural implement and its parts as oriented in the drawings. It is to be understood, however, that these terms are in no way limiting to the invention since the implement may obviously be disposed in many different positions when in use.

The present invention may, of course, be carried out in any other specific way than those herein set forth without departing from the spirit and essential characteristics of the invention. The present embodiments are, therefore, to be considered in all respects as illustrative and not restrictive and all changes coming in the meaning and equivalency range are intended to be embraced herein.

I claim:

1. In combination, an agricultural implement comprising: a frame; first elongated, shaft-like housing having two ends; one end of said housing hingedly mounted on said frame for movement solely about a horizontal axis whereby the other end of said housing can travel in a vertical plane; a first vegetation cutting and earth scarifying mechanism operatively connected to the end of said housing opposite said frame; first ground engaging support means connected to said first elongated housing adjacent the first mechanism; a second elongated housing hingedly mounted solely for vertical movement on said frame in spaced horizontal relation to said first mentioned housing; a second cutting and scarifying mechanism operatively mounted on the end of said second housing opposite said frame in such a manner that the swath cut by said second mentioned mechanism will overlap the swath cut by the first mechanism as the implement moves over the ground; second ground engaging support means connected to second elongated housing adjacent the second mechanism; a third elongated housing pivotedly mounted on said frame for movement in both horizontal and vertical planes; third and fourth cutting and scarifying mechanisms operatively mounted within a single mechanism housing on the end of said third elongated housing opposite said frame in such a manner that the swath cut by said third and fourth mechanisms will at all times overlap at least one of the swaths cut by the first two mentioned mechanisms and will move laterally toward such swaths when an obstruction is encountered; and height adjustable, third ground engaging support means connected to said third elongated housing adjacent the mechanism housing.

2. The implement of claim 1 wherein the third support means is a frustr-conical shaped member having its smaller end rotatively mounted on said elongated housing and so disposed to encompass such housing.

3. The implement of claim 1 wherein the cutting and scarifying mechanisms include an enclosed, generally circular, horizontally disposed mechanism housing means; means for connectively attaching said mechanism housing to its respective elongated housing; a vertically disposed, longitudinally slideable shaft means rotatively mounted generally in the center of said housing and extending therebelow; a horizontally disposed gear means rotatively mounted on said shaft within said housing; means carried within said attaching means to rotate said gear means; a first clutch means rotatively mounted on said shaft means and fixedly secured to said gear means; second clutch means fixedly secured to said shaft means in resistive releasable operative engagement with said first clutch means; biasing means associated with said shaft urging engagement between said clutch means; and cutter means fixedly attached to said shaft below said housing whereby said gear means may continue to rotate with said cutter means, and thereby said shaft, are stationary.

4. The device of claim 1 wherein the said mechanism housing is a floating cutter head, and wherein a biasing means is operatively interposed between the frame and said mechanism housing to bias the latter outwardly while permitting lateral inward movement thereof relative to the frame.

5. The device of claim 1 wherein the third support means is rotatably mounted about the longitudinal axis of said third elongated housing.

6. The device of claim 5 wherein the third ground engaging support is conical in shape.